(12) United States Patent
Cui et al.

(10) Patent No.: US 11,614,263 B2
(45) Date of Patent: Mar. 28, 2023

(54) REFRIGERATOR

(71) Applicant: HISENSE RONSHEN (GUANGDONG) REFRIGERATOR CO., LTD., Guangdong (CN)

(72) Inventors: Xiangqian Cui, Guangdong (CN); Yonghong Gao, Guangdong (CN); Donghua Fu, Guangdong (CN); Lipin Wang, Guangdong (CN)

(73) Assignee: HISENSE RONSHEN (GUANGDONG) REFRIGERATOR CO., LTD., Guangdong (CN)

( * ) Notice: Subject to any disclaimer, the term of this patent is extended or adjusted under 35 U.S.C. 154(b) by 163 days.

(21) Appl. No.: 17/271,772

(22) PCT Filed: Nov. 28, 2019

(86) PCT No.: PCT/CN2019/121654
§ 371 (c)(1),
(2) Date: Feb. 26, 2021

(87) PCT Pub. No.: WO2020/108575
PCT Pub. Date: Jun. 4, 2020

(65) Prior Publication Data
US 2021/0325099 A1    Oct. 21, 2021

(30) Foreign Application Priority Data
Nov. 28, 2018   (CN) .......................... 201811449062.5

(51) Int. Cl.
*F25C 1/10*    (2006.01)
*F16H 21/40*   (2006.01)
*F25D 11/02*   (2006.01)

(52) U.S. Cl.
CPC ............... *F25C 1/10* (2013.01); *F16H 21/40* (2013.01); *F25D 11/02* (2013.01)

(58) Field of Classification Search
CPC .......... F25C 1/10; F25C 1/24; F25C 2400/06; F16H 21/40; F25D 11/02; F25D 23/12
(Continued)

(56) References Cited

U.S. PATENT DOCUMENTS 2,104,480 A  *  1/1938  Giffard ..................... F25C 1/24
                                                     62/300
2,278,229 A  *  3/1942  Easa ......................... F25C 1/24
                                                     62/301
(Continued)

FOREIGN PATENT DOCUMENTS

| CN | 1886627 A | 12/2006 |
|----|-----------|---------|
| CN | 2874365 A | 2/2007  |

(Continued)

OTHER PUBLICATIONS

International Search Report and Written Opinion issued in corresponding International Application No. PCT/CN2019/121654 dated Feb. 26, 2020, with English translation.

(Continued)

*Primary Examiner* — Eric S Ruppert
*Assistant Examiner* — Kirstin U Oswald
(74) *Attorney, Agent, or Firm* — Morgan, Lewis & Bockius LLP

(57) ABSTRACT

A refrigerator includes a freezer compartment and an ice-making apparatus. The ice-making apparatus includes a support, a plurality of ice cube trays, a connecting rod rotating shaft, and a swinging member. Each ice cube tray includes a tray body, and a driving shaft and a hinge shaft connected to the tray body. The connecting rod rotating shaft includes a rotating shaft and a swinging shaft that are arranged in parallel and spaced from each other, and a connecting section connecting the rotating shaft and the swinging shaft. The swinging member includes a body, a (Continued)

hinge hole provided in the body and a plurality of support portions provided on the body.

19 Claims, 10 Drawing Sheets

(58) Field of Classification Search
USPC .......................................................... 62/353
See application file for complete search history.

(56) References Cited

U.S. PATENT DOCUMENTS

| | | | | |
|---|---|---|---|---|
| 3,188,827 | A | * | 6/1965 | Bauerlein ................. F25C 1/04 62/344 |
| 4,852,359 | A | * | 8/1989 | Manzotti ................... F25C 1/10 62/353 |
| 5,345,783 | A | | 9/1994 | Nishikawa |
| 2007/0163285 | A1 | | 7/2007 | An |
| 2009/0145159 | A1 | | 6/2009 | Kim et al. |
| 2009/0178431 | A1 | * | 7/2009 | Cho ........................... F25C 1/04 62/345 |
| 2017/0108258 | A1 | * | 4/2017 | Jeong ........................ F25C 5/24 |
| 2019/0331385 | A1 | * | 10/2019 | Jeong ........................ F25C 5/22 |

FOREIGN PATENT DOCUMENTS

| | | | |
|---|---|---|---|
| CN | 2890786 | Y | 4/2007 |
| CN | 102494452 | A | 6/2012 |
| CN | 202309403 | U | 7/2012 |
| CN | 104748468 | A * | 7/2015 |
| CN | 104748468 | A | 7/2015 |
| CN | 104748468 | B | 2/2017 |
| CN | 107606839 | A | 1/2018 |
| CN | 109579407 | A | 4/2019 |
| DE | 2 207 337 | A1 | 8/1972 |
| DE | 43 29 870 | A1 | 5/1994 |
| DE | 10 2008 046 401 | A1 | 6/2009 |
| DE | 10 2008 063 200 | A1 | 7/2009 |
| FR | 2 402 421 | A1 | 4/1979 |
| GB | 1 362 937 | A | 8/1974 |
| JP | H03-140772 | A | 6/1991 |
| JP | 2006105421 | A * | 4/2006 |
| WO | WO-2010114186 | A1 * | 10/2010 ............... F25C 1/04 |

OTHER PUBLICATIONS

First Office Action issued in corresponding Chinese Patent Application No. 201811449062.5 dated Dec. 18, 2019, with English translation.
Second Office Action issued in corresponding Chinese Patent Application No. 201811449062.5 dated Jun. 22, 2020, with English translation.
Notification to Grant Patent Right for Invention issued in corresponding Chinese Patent Application No. 201811449062.5 dated Aug. 18, 2020, with English translation.
Nang Yiu, "Synthesis of 4-bar Linkages with Optimum Transmission Characteristics", China Academic Journal Electronics Publishing House, 2019, with English translation.
Extended European Search Report issued in corresponding European Application No. 19888605.3 dated Jul. 22, 2022.
International Search Report and Written Opinion issued in corresponding International Application No. PCT/CN2019/121654 dated Feb. 26, 2020, with English translation of International Search Report.

* cited by examiner

REFRIGERATOR

CROSS-REFERENCE TO RELATED APPLICATIONS

This application is the U.S. National Phase under 35 U.S.C § 371 of International Application No. PCT/CN2019/121654 filed on Nov. 28, 2019, which claims the benefit of Chinese Patent Application No. 201811449062.5, filed with the Chinese Patent Office on Nov. 28, 2018, both of which are incorporated herein by reference in its entirety.

TECHNICAL FIELD

The present disclosure relates to a refrigerator.

BACKGROUND

As users' demand for multi-functional refrigerators increases, more and more refrigerators with various functions have appeared in the market. For example, based on users' demand for ice, refrigerators having an ice-making function have appeared.

SUMMARY

A refrigerator is provided. The refrigerator includes a freezer compartment and an ice-making apparatus. A temperature inside the freezer compartment is capable of being below zero degrees Celsius, and the ice-making apparatus is disposed in the freezer compartment. The ice-making apparatus includes a support, a plurality of ice cube trays arranged in parallel, a connecting rod rotating shaft, and a swinging member. Each ice cube tray includes a tray body, and a driving shaft and a hinge shaft connected to the tray body. The driving shaft and the hinge shaft are parallel to each other, and the ice cube tray is hinged in the support through the hinge shaft. The connecting rod rotating shaft includes a rotating shaft and a swinging shaft that are arranged in parallel and spaced from each other, and a connecting section connecting the rotating shaft and the swinging shaft. The connecting rod rotating shaft is hinged to the support through the rotating shaft. The swinging member includes a body, a hinge hole provided in the body and a plurality of support portions provided on the body. The swinging shaft is installed in the hinge hole. The driving shaft of the ice cube tray is installed on a corresponding support portion, so that the swinging member is swingably connected between the support and the plurality of ice cube trays. The rotating shaft is configured to drive the swinging shaft to rotate, so that the swinging shaft drives the swinging member to swing, then the swinging member drives the driving shaft to rotate around the hinge shaft, and finally each ice cube tray rotates around a corresponding hinge shaft. Driving shafts are configured in a way that: during rotation of the plurality of ice cube trays from respective ice-making positions to respective ice-dumping positions, a connecting line between each driving shaft and a corresponding hinge shaft rotates around the corresponding hinge shaft and stops rotating before reaching a connecting line between the rotating shaft and the corresponding hinge shaft for a first time.

BRIEF DESCRIPTION OF THE DRAWINGS

In order to describe technical solutions in some embodiments of the present disclosure or in the related art more clearly, the accompanying drawings to be used in some embodiments of the present disclosure or the related art will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

Figure 1:
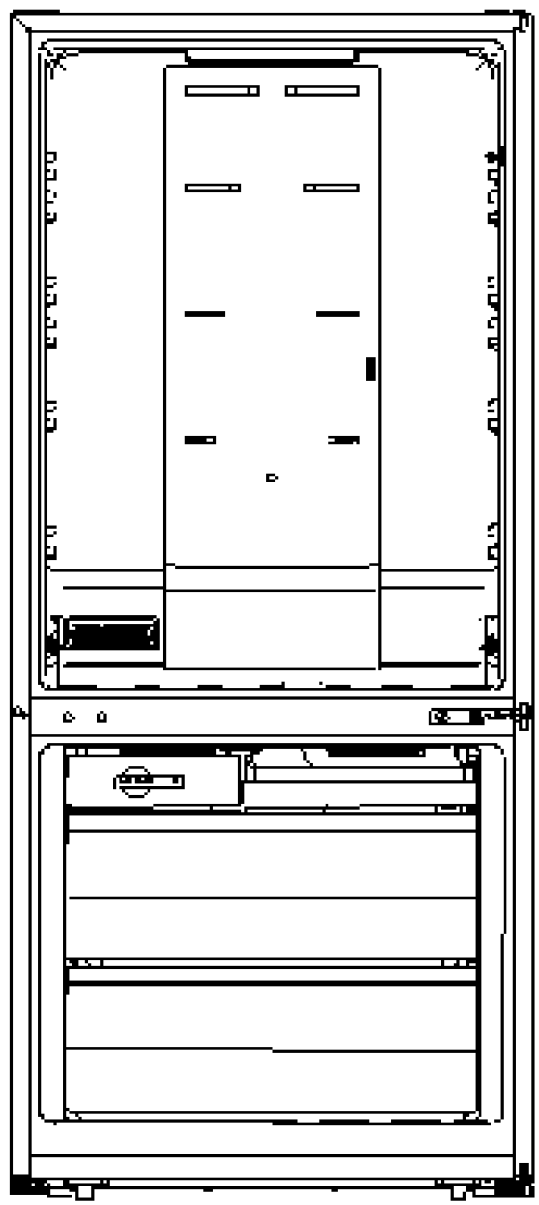
FIG. 1 is a schematic structural diagram of a refrigerator according to some embodiments of the present disclosure.

The refrigerator provided in some embodiments of the present disclosure will be described in detail below with reference to the accompanying drawings.

In the description of the present disclosure, orientations or positional relationships indicated by terms "center", "upper", "lower", "front", "rear", "left", "right", "vertical", "horizontal", "top", "bottom", "inner", "outer", etc. are based on orientations or positional relationships shown in the drawings, merely to facilitate and simplify the description of the present disclosure, but not to indicate or imply that the referred devices or elements must have a particular orientation, or must be constructed or operated in a particular orientation. Therefore, these terms should not be construed as limitations to the present disclosure.

Terms "first" and "second" are merely used for a purpose of description and are not to be construed as indicating or implying the relative importance or implicitly indicating the number of referred technical features. Thus, features defined with "first", "second" may explicitly or implicitly include one or more of the features. In the description of the present disclosure, the term "a plurality of" means two or more unless otherwise specified.

Figure 2:
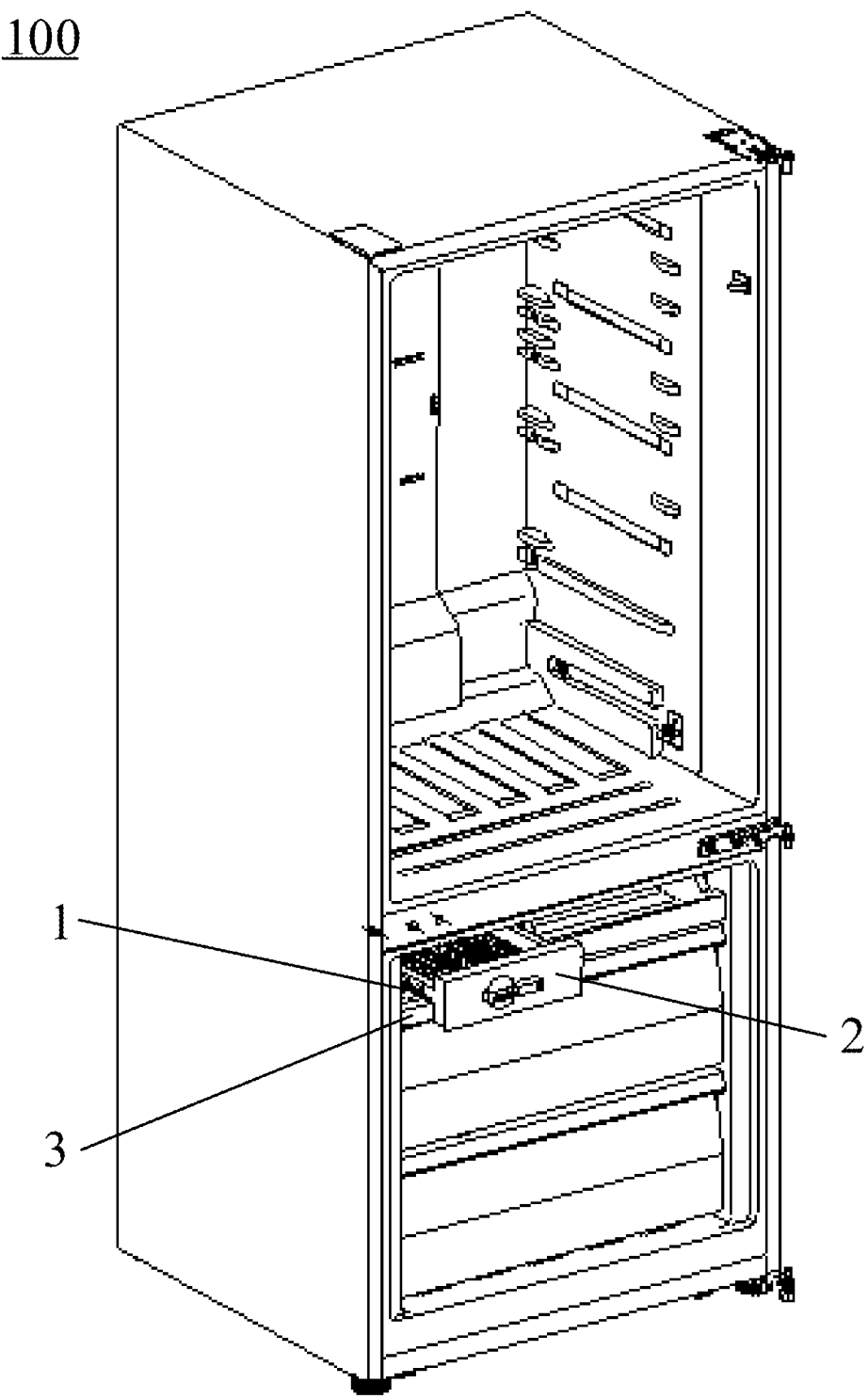
FIG. 2 is a schematic structural diagram of another refrigerator according to some embodiments of the present disclosure.
Figure 3:
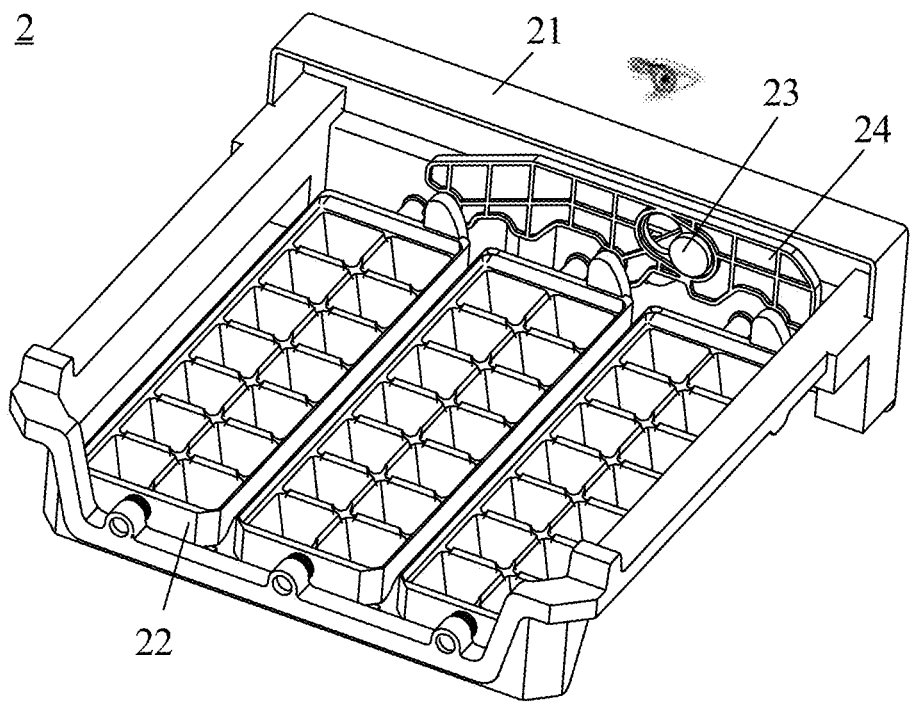
FIG. 3 is a schematic structural diagram of a plurality of ice cube trays in an ice-making apparatus at an ice-making position according to some embodiments of the present disclosure.

Referring to FIGS. 1 and 2, some embodiments of the present disclosure provide a refrigerator 100. The refrigerator 100 includes a freezer compartment 1 and an ice-making apparatus 2. A temperature inside the freezer compartment 1 is below zero degrees Celsius, and the ice-making apparatus 2 is disposed in the freezer compartment 1. Herein, the ice-making apparatus 2 is disposed in the freezer compartment 1 in a drawable manner, and thus a space utilization rate of the freezer compartment 1 may be improved.

In some examples, referring to FIGS. 1 and 2, the refrigerator 100 further includes an ice-storage bin 3. The ice-storage bin 3 is disposed in the freezer compartment 1 and is located below the ice-making apparatus 2, so as to receive ice falling from the ice-making apparatus 2 and store the ice falling from the ice-making apparatus 2 into the ice-storage bin 3.

In some embodiments, referring to FIGS. 3 to 7, the ice-making apparatus 2 includes: a support 21, a plurality of ice cube trays 22 arranged in parallel, a connecting rod rotating shaft 23, and a swinging member 24.

Figure 5:
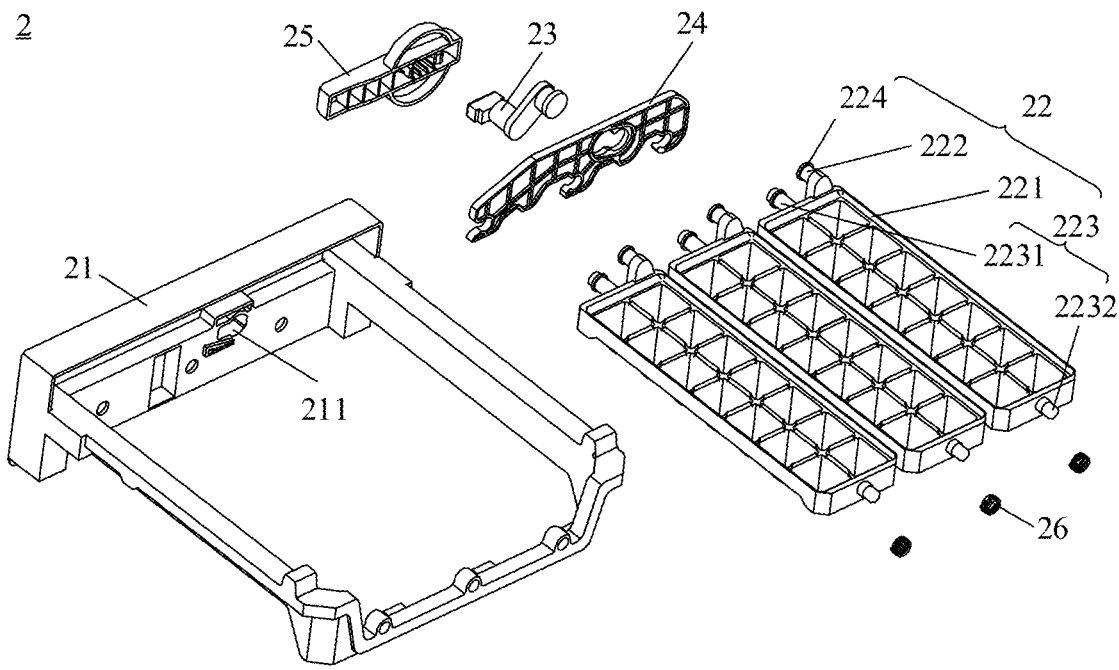
FIG. 5 is a schematic exploded view of an ice-making apparatus according to some embodiments of the present disclosure.
Figure 6:
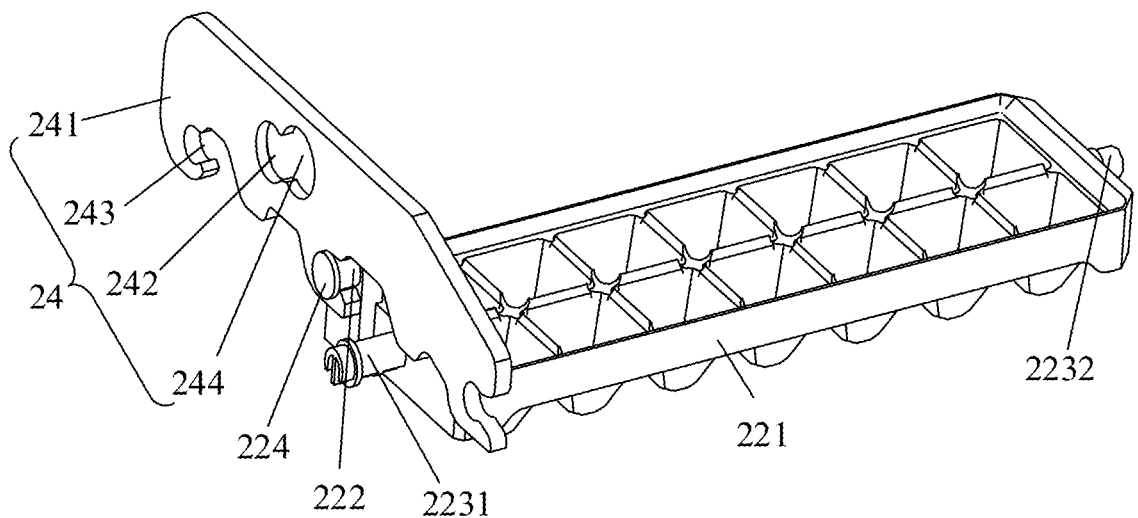
FIG. 6 is a schematic structural diagram showing how a swinging member and an ice cube tray are assembled according to some embodiments of the present disclosure.
Figure 7:
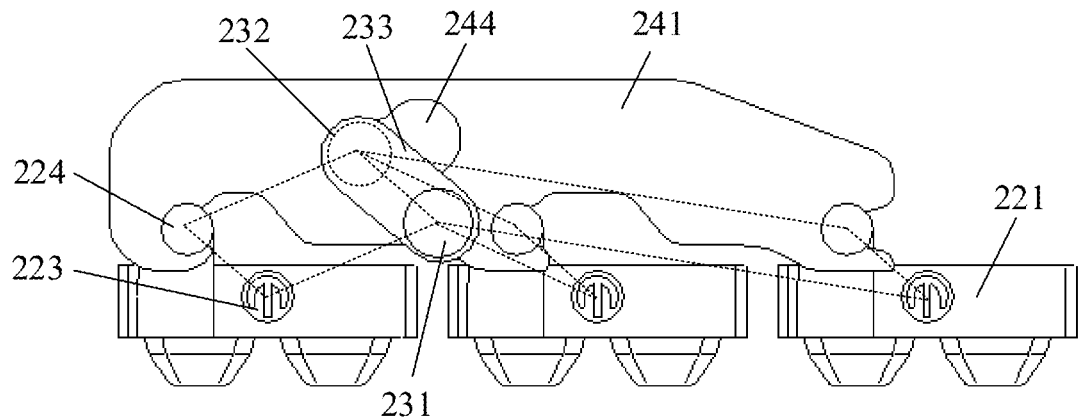
FIG. 7 is a schematic structural diagram showing how a swinging member, a connecting rod rotating shaft, and three ice cube trays are assembled according to some embodiments of the present disclosure.

In some examples, referring to FIGS. 5 and 6, each of the plurality of ice cube trays 22 includes a tray body 221, and a driving shaft 222 and a hinge shaft 223 connected to the tray body 221. The driving shaft 222 and the hinge shaft 223 are parallel to each other (that is, an axis of the driving shaft 222 and an axis of the hinge shaft 223 are parallel to each other). Each ice cube tray 22 is hinged in the support 21 through a corresponding hinge shaft 223, so that the ice cube tray 22 can rotate around the corresponding hinge shaft 223 in the support 21 with the corresponding hinge shaft 223 as a fixed point.

The support 21 may have various structures. For example, referring to FIG. 5, the support 21 includes a rectangular frame, and the rectangular frame is arranged in a shape of a ring. Correspondingly, each tray body 221 is in a shape of a rectangle or a square. In this way, a plurality of tray bodies 221 may be provided in the support 21, so as to improve a space utilization rate of the support 21 and in turn a space utilization rate of the refrigerator 100.

There are various ways for connecting the driving shaft 222 and the hinge shaft 223 to the corresponding tray body 221. For example, the driving shaft 222 is connected to the corresponding tray body 221 in a fixed manner or in a detachable manner; and the hinge shaft 223 is connected to the corresponding tray body 221 in a fixed manner or in a detachable manner. Since the ice cube tray 22 needs to rotate between an ice-making position and an ice-dumping position, and a probability of the driving shaft 222 and the hinge shaft 223 malfunctioning and needing to be replaced is small, the driving shaft 222 and the hinge shaft 223 are usually connected to the corresponding tray body 221 in a fixed manner.

The hinge shaft 223 has various structures. For example, referring to FIGS. 3 to 5, the hinge shaft 223 includes a first hinge shaft 2231 and a second hinge shaft 2232. The first hinge shaft 2231 is located between a first side of the corresponding tray body 221 (e.g., an upper left side of the tray body 221 shown in FIG. 5) and a first border of the rectangular frame (e.g., an upper left border of the support 21 shown in FIG. 5). The second hinge shaft 2232 is located between a second side of the corresponding tray body 221 (e.g., a lower right side of the tray body 221 shown in FIG. 5) and a second border of the rectangular frame (e.g., a lower right border of the support 21 shown in FIG. 5). Herein, the first side is opposite to the second side, and the first border is opposite to the second border. An axis of the first hinge shaft 2231 coincides with an axis of the second hinge shaft 2232. In this way, each tray body 221 may be supported at two opposite points, and a stability of rotation of each ice cube tray 22 around the axis of the corresponding first hinge shaft 2231 may be improved.

In some examples, referring to FIGS. 3 to 5, 7 and 8, the connecting rod rotating shaft 23 includes a rotating shaft 231 and a swinging shaft 232 that are arranged in parallel and spaced from each other, and a connecting section 233 connecting the rotating shaft 231 and the swinging shaft 232. The connecting rod rotating shaft 23 is hinged to the support 21 through the rotating shaft 231. For example, referring to FIG. 5, a first hole 211 is provided in the support 21. The rotating shaft 231 passes through the first hole 211, so that the connecting rod rotating shaft 23 may be able to rotate with the first hole 211 as a fixed point.

A structure of the connecting section 233 is, for example, a plate-like structure or a strip-like structure. The description that the rotating shaft 231 and the swinging shaft 232 are arranged in parallel and spaced from each other means that, an axis of the rotating shaft 231 and an axis of the swinging shaft 232 are parallel to each other, and the rotating shaft 231 and the swinging shaft 232 are respectively located at two opposite ends of the connecting section 233, and are respectively located on two opposite side surfaces of the connecting section 233. The connecting section 233 has a certain rigidity, so that a relative distance between the rotating shaft 231 and the swinging shaft 232 remains substantially constant.

In some examples, referring to FIGS. 3 to 7, the swinging member 24 includes a body 241, a hinge hole 242 provided in the body 241, and a plurality of support portions 243 provided on the body 241. The swinging shaft 232 is installed in the hinge hole 242, and a driving shaft 222 of each ice cube tray 22 is installed on a corresponding support portion 243. In this way, the swinging member 24 is swingably connected between the support 21 and the plurality of ice cube trays 22.

An overall shape of the body 241 is a sheet-like shape or a plate-like shape, so that a space occupied by the body 241 may be reduced, a swinging resistance encountered by the body 241 during a swing process may be reduced, and thus the body 241 may swing more smoothly. A structure of the body 241 is, for example, a hollow structure, so that a weight of the body 241 may be reduced.

In addition, the body 241 has a certain rigidity, so that deformation of the swinging member 24 during the swing process may be avoided, and relative distances between the swinging shaft 232 and the plurality of driving shafts 222 installed on the swinging member 24 may remain substantially constant.

After ice is made by the ice-making apparatus 2, an ice-dumping process is as follows: a driving force is applied to the rotating shaft 231 to make the rotating shaft 231 rotate, then the rotating shaft 231 drives the swinging shaft 232 to rotate, and then the swinging shaft 232 drives the swinging member 24 to swing through the hinge hole 242. During the swing process of the swinging member 24, the swinging member 24 will drive the plurality of driving shafts 222 installed on the plurality of support portions 243 of the swinging member 24 to rotate around corresponding hinge shafts 223 respectively. Since each driving shaft 222 is connected to a corresponding tray body 221, during a rotation process of the driving shaft 222 around a corresponding hinge shaft 223, the driving shaft 222 will drive the ice cube tray 22 to rotate around the corresponding hinge shaft 223, and thus drive the ice cube tray 22 to rotate from the ice-making position to the ice-dumping position, so as to complete an ice-dumping process of all ice cube trays 22 all at once.

To facilitate a better understanding of the present disclosure by those skilled in the art, a rotation principle of each ice cube tray 22 of the ice-making apparatus 2 used in the refrigerator 100 is schematically described below. Herein, an example is taken in which the ice-making apparatus 2 includes three ice cube trays 22.

Figure 18:
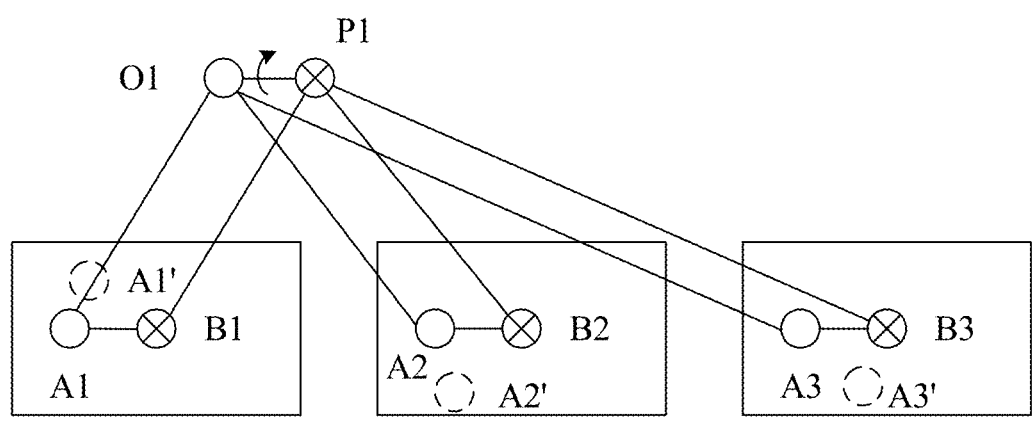
FIG. 18 is a schematic diagram of an equivalent structure of an ice-making apparatus according to some embodiments of the present disclosure.

The ice cube trays 22, the connecting shaft 23, and the swinging member 24 of the ice-making apparatus 2 shown in FIGS. 3 to 7 may be equivalent to a structure shown in FIG. 18. This structure is obtained by observing the ice-making apparatus by a user standing in front of a surface of the ice cube tray 22 on which the driving shaft 222 and the hinge shaft 223 are disposed. For example, a position of the user is a position of the eyes shown in FIG. 4.

Referring to FIG. 18, when the user faces the surface of the ice cube tray 22 on which the driving shaft 222 and the hinge shaft 223 are disposed, an ice cube tray 22 on the left is a first ice cube tray, an ice cube tray 22 in the middle is a second ice cube tray, and an ice cube tray 22 on the right is a third ice cube tray. A driving shaft 222 of the first ice cube tray is equivalent to A1, and a hinge shaft 223 of the first ice cube tray is equivalent to B1. A driving shaft 222 of the second ice cube tray is equivalent to A2, and a hinge shaft 223 of the second ice cube tray is equivalent to B2. A driving shaft 222 of the third ice cube tray is equivalent to A3, and a hinge shaft 223 of the third ice cube tray is equivalent to B3. The swinging shaft 232 is equivalent to O1, and the rotating shaft 231 is equivalent to P1. B1, B2, B3, and P1 only have a rotational degree of freedom, and A1, A2, A3, and O1 have a rotational degree of freedom and translational degrees of freedom. A1, B1, P1, and O1 are connected one by one. Since a relative distance between P1 and O1 remains substantially constant, a relative positional relationship between A1 and B1, and a relative positional relationship between B1 and P1 will remain substantially unchanged. Therefore, A1-B1-P1-O1 may constitute a four-bar linkage. Similarly, A2-B2-P1-O1 and A3-B3-P1-O1 each constitute a four-bar linkage.

Figure 19:
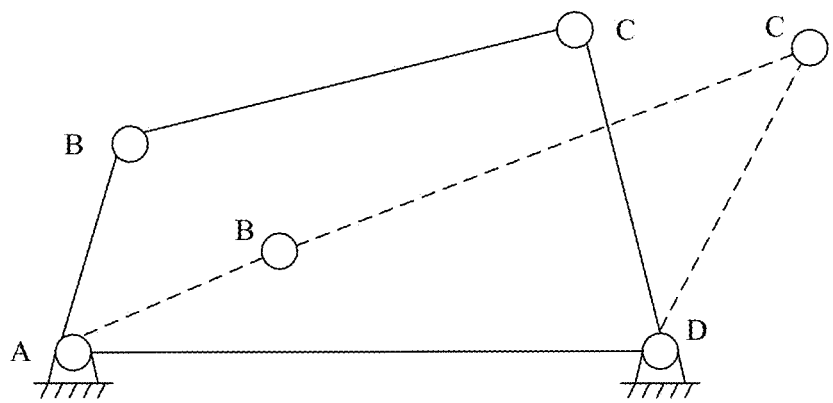
FIG. 19 is a motion analysis diagram of a common four-bar linkage.

Referring to FIG. 19, in a four-bar linkage, a fixed link AD is called a frame, links AB and CD that are connected to the frame AD are called side links, and link BC that is not connected to the frame is called a coupler link. As shown by the dotted line in FIG. 19, in a case where the side link CD is used as a driving link and rotates clockwise, when the side link CD drives the side link AB and the coupler link BC to move to a straight line (regardless of a gravity of the links), a torque acting on the coupler link BC and the side link AB that is used as a driven link may be 0, and the side link AB and the coupler link BC may not be able to continue to move at this time. A position where the side link AB and the coupler link BC move to a straight line is called a dead point position.

In an equivalent four-bar linkage shown in FIG. 18, with the first ice cube tray as an example, a connecting line P1-B1 is a part of the support 1 in an actual structure and functions as the frame; a connecting line P1-O1 is the connecting section 233 in the actual structure and functions as the side link; a connecting line A1-B1 is a part of the first ice cube tray in the actual structure and functions as the side link; and a connecting line O1-A1 is a part of the swinging member 24 in the actual structure and functions as the coupler link. As for the second ice cube tray and the third ice cube tray, the situation is similar.

In a case where positions of P1, O1 and B1 (or B2, B3) are determined, a position of A1 (or A2, A3) may be set so that during a rotation process of each ice cube tray 22 from the ice-making position to the ice-dumping position, the connecting line A1-B1 (or A2-B2, A3-B3) between A1 (or A2, A3) and B1 (or B2, B3) is able to rotate around B1 (or B2, B3), and is able to stop rotating before reaching the connecting line P1-B1 (or P2-B2, P3-B3) between P1 and B1 (or B2, B3) for the first time. Of course, a position of B1 (or B2, B3), or positions of P1 and O1 may also be set to achieve the same effect. In this way, the four-bar linkage may be prevented from reaching the dead point position. That is, a situation where the ice cube tray 22 cannot rotate smoothly or even become stuck during a rotation process thereof from the ice-making position to the ice-dumping position may be avoided.

In some examples, when the ice cube tray 22 is at the ice-making position, a plane on which the ice cube tray 22 is located is perpendicular to or substantially perpendicular to a gravity direction of the ice cube tray 22. That is, the ice-making position of the ice cube tray 22 is a position where the ice cube tray 22 is on a horizontal plane or substantially on a horizontal plane. When the ice cube tray 22 is at the ice-dumping position, the ice cube tray is rotated by an angle greater than or equal to 90°, so that the ice in the ice cube tray 22 can fall off from the ice cube tray 22. In some embodiments, "substantially" refers to a tolerance of about 5% from an ideal state.

For example, in a case where P1-O1 is used as the driving link, the inventor hopes to design A1-B1 in a way that A1-B1 is able to stop rotating before reaching P1-B1 for the first time after rotating clockwise by at least 90°; design A2-B2 in a way that A2-B2 is able to stop rotating before reaching P1-B2 for the first time after rotating clockwise by at least 90°; and design A3-B3 in a way that A3-B3 is able to stop rotating before reaching P1-B3 for the first time after rotating clockwise by at least 90°. In this way, the four-link linkages A1-B1-P1-O1, A2-B2-P1-O1, and A3-B3-P1-O1 may be prevented from reaching respective dead point positions during the rotation process, and a rotation performance and a smoothness of rotation of the four-link linkages A1-B1-P1-O1, A2-B2-P1-O1 and A3-B3-P1-O1 may be improved. For example, a position of A1 may be set at A1', a position of A2 may be set at A2', and a position of A3 may be set at A3'.

In the ice-making apparatus 2 in the refrigerator 100 provided in some embodiments of the present disclosure, positions of a connecting rod rotating shaft 23, the swinging member 24, and the plurality of ice cube trays 22 are provided; the connecting section 233 of the connecting rod rotating shaft 23 is used to connect the rotating shaft 231 and the swinging shaft 232, and provide a fixed distance between the rotating shaft 231 and the swinging shaft 232; and the swinging member 24 is used to connect the swinging shaft 232 and the driving shaft 222 of each ice cube tray 22, and provide a fixed distance between the swinging shaft 232 and each driving shaft 222. In this way, it may be possible to ensure that distances among the rotating shaft 231, the swinging shaft 232, the driving shafts 222, and the corresponding hinge shafts 223 remain constant during a process in which the connecting rod rotating shaft 23 drives the plurality of ice cube trays 22 to rotate synchronously through the swinging member 23, and the rotating shaft 231, the swinging shaft 232, the driving shafts 222, and the corresponding hinge shafts 223 constitute a plurality of four-bar linkages. Moreover, on this basis, in some embodiments of the present disclosure, a position of the rotating shaft 231, or a position of the swinging shaft 232, or a position of each driving shaft 222, or a position of each hinge shaft 223 may be specially arranged, so that during the rotation of each ice cube tray 22 from its ice-making position to its ice-dumping position, the connecting line between the driving shaft 222 and a corresponding hinge shaft 223 rotates around the corresponding hinge shaft 223 and stops rotating before reaching the connecting line between the rotating shaft 231 and the corresponding hinge shaft 223 for the first time. In this way, each ice cube tray 22 may be prevented from reaching the dead point position during a rotation process thereof to the ice-dumping position; a situation where the ice cube tray 22 cannot rotate smoothly or even become stuck may be avoided; and the rotation performance and the smoothness of rotation of the ice cube tray 22 may be improved.

In some embodiments, a plane defined by an axis of the driving shaft 222 and an axis of the hinge shaft 223 of each ice cube tray 22 is parallel to a plane defined by an axis of the swinging shaft 232 and an axis of the rotating shaft 231. Moreover, a distance between the axis of the driving shaft 222 and the axis of the hinge shaft 223 of each ice cube tray 22 is equal to a distance between the axis of the swinging shaft 232 and the axis of the rotating shaft 231. That is to say, the four-link linkage composed of the swinging shaft 232, the rotating shaft 231, and the driving shaft 222 and the hinge shaft 223 in each ice cube tray 22 is a parallelogram mechanism. The swinging shaft 232, the rotating shaft 231, and the driving shafts 222 and the hinge shafts 223 in the plurality of ice cube trays 22 together constitute a plurality of parallel four-bar linkages sharing one side.

Herein, referring to FIGS. 18 and 19, it will be seen that, in a parallelogram mechanism, during a process in which a side link drives a coupler link and another side link to rotate, the another side link may be able to rotate by an angle close to 180° before reaching the dead point position. However, in an ordinary four-link linkage, during a process in which a side link drives a coupler link and another side link to rotate, the another side link is only able to rotate by an angle far less than 180° before reaching the dead point position. Therefore, by setting the four-link linkage composed of the swinging shaft 232, the rotating shaft 231, and the driving shaft 222 and the hinge shaft 223 in each ice cube tray 22 as a parallelogram mechanism, each ice cube tray may be able to rotate by a larger angle before reaching the dead point position, and a stability of the ice cube trays 22 in synchronized rotation may be improved.

Figure 4:
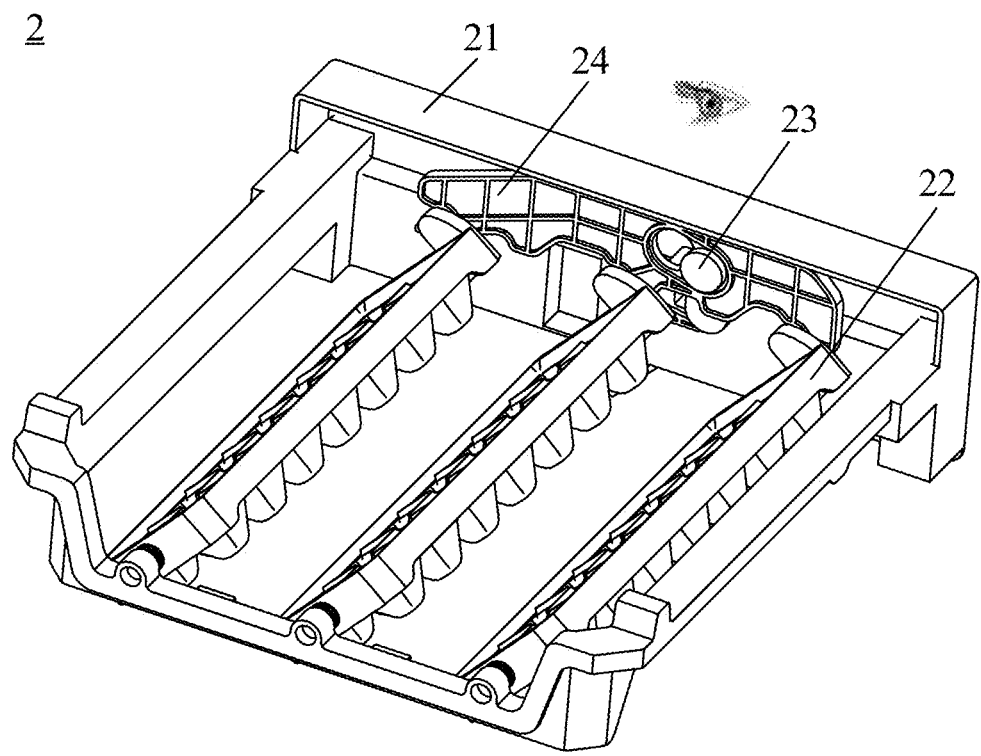
FIG. 4 is a schematic structural diagram of the plurality of ice cube trays shown in FIG. 3 at an ice-dumping position.

It will be noted that, in the three parallelogram mechanisms A1-B1-P1-O1, A2-B2-P1-O1, and A3-B3-P1-O1 shown in FIGS. 18, A1, A2, A3, B1, B2, and B3 are located in a plane parallel to a plane defined by the top surfaces of the plurality of ice cube trays 22 (e.g., a horizontal plane); a position of P1 is higher than that of B1, B2, and B3 in a vertical direction; and when viewed from the position shown in FIG. 4, A1 is located on a left side of B1, A2 is located on a left side of B2, and A3 is located on a left side of B3. Such a design may be referred to as a basic design. It will be seen from FIG. 18 that, in the basic design, if P1-O1 is used as a driving link and is made to rotate clockwise, A1-B1 will not reach a position of P1-B1 after rotating by 90°. That is, during rotation of the first ice cube tray from its ice-making position to its ice-dumping position, the first ice cube tray will not reach its dead point position. However, A2-B2 will reach the position of P1-B2 after rotating by an angle less than 90°. That is, the second ice cube tray will reach its dead point position before rotating to its ice-dumping position. Similarly, A3-B3 will reach the position of P1-B3 after rotating by an angle less than 90°. That is, the third ice cube tray will reach its dead point position before rotating to its ice-dumping position.

Therefore, in the basic design shown in FIG. 18, during rotation of the plurality of ice cube trays 22 from respective ice-making positions to respective ice-dumping positions, a problem that the plurality of ice cube trays 22 cannot move smoothly may occur. In view of this, some embodiments of the present disclosure provide another design based on the basic design, so that during the rotation of the plurality of ice cube trays 22 from respective ice-making positions to respective ice-dumping positions, the connecting line between the driving shaft 222 and the corresponding hinge shaft 223 of each ice cube tray 22 is able to stop rotating before reaching the connecting line between the rotating shaft 231 and the corresponding hinge shaft 223 for the first time.

Figure 20:
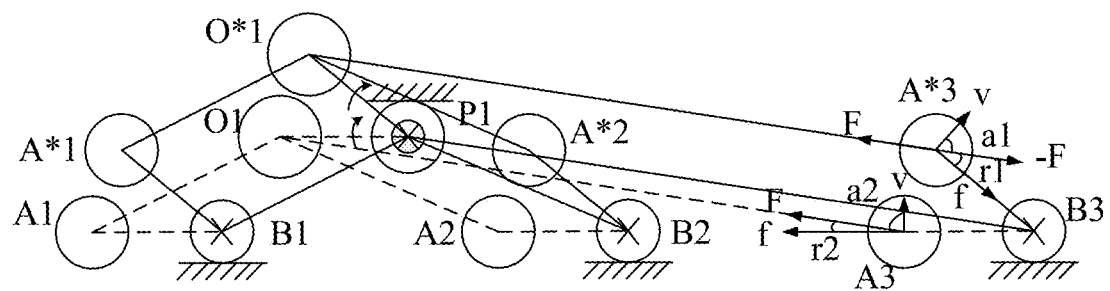
FIG. 20 is a motion analysis comparison diagram of a basic design of an ice-making apparatus and another design based on the basic design according to some embodiments of the present disclosure.

Referring to FIG. 20, in the three parallelogram mechanisms A1-B1-P1-O1, A2-B2-P1-O1, and A3-B3-P1-O1 in the basic design, when P1-O1 that is used as a driving link rotates by approximately 90° clockwise, the parallelogram mechanisms A2-B2-P1-O1 and A3-B3-P1-O1 may reach respective dead point positions, and thus the plurality of ice cube trays 22 may not be able to rotate smoothly.

Therefore, in some embodiments, referring to FIGS. 20 and 21, the another design provided by some embodiments of the present disclosure based on the basic design is shown below.

When each ice cube tray 22 is at its ice-making position, in a direction from a bottom surface of the ice cube tray 22 to a top surface of the ice cube tray 22 (i.e., a direction perpendicular to or substantially perpendicular to the horizontal plane), the rotating shaft 231 is located above the hinge shaft 223; and in a surface of each ice cube tray 22 on which the driving shaft 222 and the hinge shaft 223 are disposed, the driving shaft 222 is located at an upper left of the hinge shaft 223.

The bottom surface of the ice cube tray 22 is a bottom surface of the tray body 221, and the top surface of the ice cube tray 22 is a top surface of the tray body 221.

A specific position of the rotating shaft 231 above the hinge shaft 223 may vary, which is not limited in some embodiments of the present disclosure, and may be determined according to actual needs. For example, the rotating shaft 231 is located above the hinge shaft 223, and located between the hinge shaft 223 of the first ice cube tray 22 and the hinge shaft 223 of the second ice cube tray 22 (as shown in FIG. 20), or located between the hinge shaft 223 of the second ice cube tray 22 and the hinge shaft 223 of the third ice cube tray 22 (as shown in FIG. 21).

The description that the driving shaft 222 is located at the upper left of the hinge shaft 223 includes the following situations: in the direction from the bottom surface of the ice cube tray 22 to the top surface of the ice cube tray 22, the driving shaft 222 is located on a left side of the hinge shaft 223, and is located between the hinge shaft 223 and the rotating shaft 231, or located on a same horizontal plane as the rotating shaft 231, or located above the rotating shaft 231. That is, each driving shaft 222 will not be located directly above the corresponding hinge shaft 223, and an angle between the plane defined by the axis of the driving shaft 222 and the axis of the hinge shaft 223 and the plane defined by the plurality of ice cube trays 22 (e.g., top surfaces of the plurality of ice cube trays 22) is an acute angle. It will be noted that, the angle between the plane defined by the axis of the driving shaft 222 and the axis of the hinge shaft 223 and the top surfaces of the plurality of ice cube trays 22 is an arbitrary value, such as 10°, 15°, 27°, 45°, 60°, 75°, or 86°, which is within the protection scope of the present disclosure.

Figure 21:
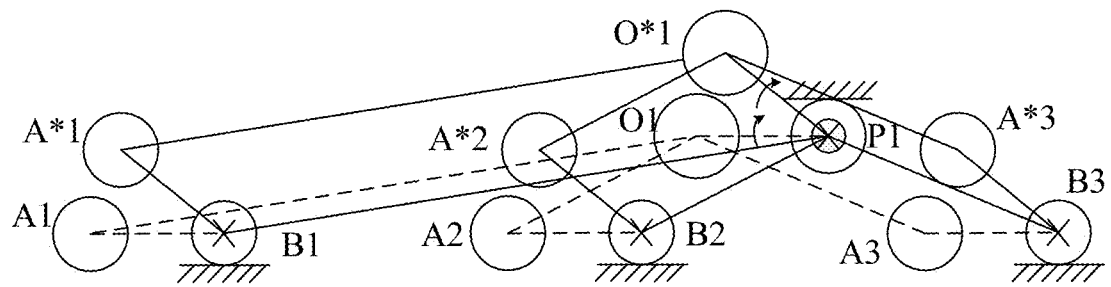
FIG. 21 is a motion analysis comparison diagram of a variant design of an ice-making apparatus and another design based on the variant design according to some embodiments of the present disclosure.

As shown in FIGS. 20 and 21, the driving shaft 222 of the first ice cube tray is equivalent to A*1, the driving shaft 222 of the second ice cube tray is equivalent to A*2, the driving shaft 222 of the third ice cube tray is equivalent to A*3, and the swinging shaft 232 is equivalent to O*1. It will be seen from FIGS. 20 and 21 that, after P1-O*1 that is used as the driving link rotates by approximately 90° clockwise, the three parallelogram mechanisms A*1-B1-P1-O*1, A*2-B2-P1-O*1 and A*3-B3-P1-O*1 will not reach respective dead point positions. Therefore, a dead point position may be avoided during a process in which each ice cube tray 22 rotates by 90° or more to rotate from the ice-making position to the ice-dumping position, and thus the rotation of each ice cube tray 22 may be more smooth.

In addition, compared with the basic design, the above design is more labor-saving during a process of rotating the plurality of ice cube trays 22. Details are described below.

Referring to FIG. 20, in the basic design, at an initial moment when the three ice cube trays 22 start to rotate synchronously, a movement direction v, a force direction F, and a movement normal direction f of A3 are all shown in FIG. 20. An acute angle between the force direction F and the movement direction v is a pressure angle a2, and an angle between the force direction F and the movement normal direction f is a transmission angle r2. In the design shown in FIG. 20, positions of B1, B2, and B3 remain the same, and in a vertical direction, A*1 is located between P1 and B1, A*2 is located between P1 and B2, and A*3 is located between P1 and B3. For example, in the vertical direction, a distance from A*1 to a top surface of a corresponding ice cube tray 22 is different from a distance from B1 to the top surface of the corresponding ice cube tray 22. However, in the basic design, a distance from A1 to the top surface of the corresponding ice cube tray 22 is the same as a distance from B1 to the top surface of the corresponding ice cube tray 22, and the same is true of other ice cube trays 22. At the initial moment when the three ice cube trays 22 start to rotate synchronously, a movement direction v, a force direction F, an opposite direction of the force direction −F, a movement normal direction f, a pressure angle a1, and a transmission angle r1 of A*3 are all shown in FIG. 20. As is apparent from FIG. 20, the pressure angle a1 is less than the pressure angle a2, and the transmission angle r1 is greater than the transmission angle r2. By reducing the pressure angle, a transmission performance of the driving shaft A*3 may be improved, and thus the rotation of the third ice cube tray 22 may be more labor-saving and more smooth.

In addition, in the vertical direction, in a case where the position of A*1 is between P1 and B1, the position of A*2 is between P1 and B2, and the position of A*3 is between P1 and B3, the position of O*1 may be adjusted, so as to adjust the pressure angle a1. The pressure angle a1 may be made as small as possible, so as to effectively improve the smoothness of rotation of each ice cube tray 22 and make the rotation of each ice cube tray 22 more labor-saving.

Movements of only three ice cube trays 22 are analyzed in FIG. 20. If the number of the ice cube trays 22 is four or more, the pressure angles of ice cube trays 22 farther away from the swinging shaft 232 of the swinging member 24 will be reduced more than in the basic design. In this way, not only a situation in which the ice cube trays 22 cannot rotate or even become stuck may be avoided, but also the rotation performance of the ice cube trays 22 may be improved, and the rotation of the ice cube trays may be made more labor-saving. In addition, by providing a plurality of ice cube trays 22, more ice may be taken out when the ice is dumped all at once, and an ice-making efficiency may be effectively improved.

An angle between the plane defined by the axis of the driving shaft 222 and the axis of the hinge shaft 223 of each ice cube tray 22 and the plane defined by the top surfaces of the plurality of ice cube trays 22 is equal. Therefore, the plurality of ice cube trays 22 may basically maintain synchronous rotation during the rotation process thereof, and the rotation stability of the plurality of ice cube trays 22 may be improved.

In some embodiments of the present disclosure, the basic design also has many variant designs.

Figure 22:
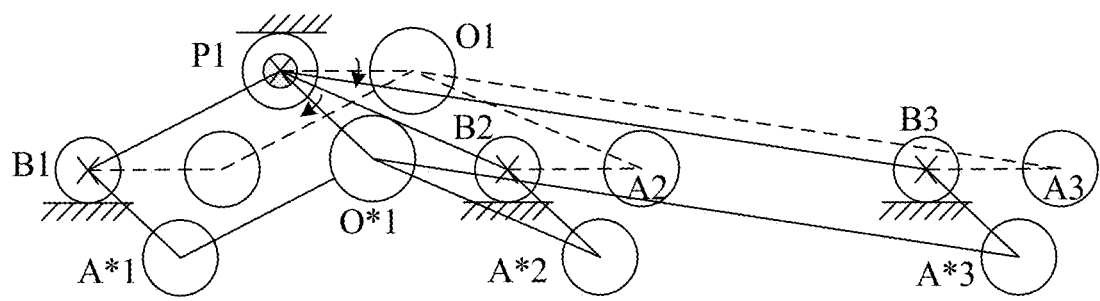
FIG. 22 is a motion analysis comparison diagram of another variant design of an ice-making apparatus and another design based on the another variant design according to some embodiments of the present disclosure.

A variant design provided by some embodiments of the present disclosure is as shown in FIG. 22. Referring to FIG. 22, in the three parallelogram mechanisms A1-B1-P1-O1, A2-B2-P1-O1, and A3-B3-P1-O1, A1, A2, A3, B1, B2, and B3 are located in a plane parallel to the plane defined by the top surfaces of the plurality of ice cube trays 22 (e.g., a horizontal plane). A position of P1 is higher than that of B1, B2, and B3 in a vertical direction, and when viewed from the position shown in FIG. 4, A1 is located on the right side of B1, A2 is located on the right side of B2, and A3 is located on the right side of B3.

It will be seen from FIG. 22 that, in the variant design, if P1-O1 is used as a driving link and is made to rotate clockwise, A1-B1 will not reach a position of P1-B1 after rotating by 90°. That is, during rotation of the first ice cube tray from its ice-making position to its ice-dumping position, the first ice cube tray will not reach the dead point position. However, A2-B2 will reach the position of P1-B2 after rotating by an angle less than 90°. That is, the second ice cube tray will reach its dead point position before rotating to its ice-dumping position. Similarly, A3-B3 will reach the position of P1-B3 after rotating by an angle less than 90°. That is, the third ice cube tray will reach its dead point position before rotating to its ice-dumping position.

Therefore, in the variant design shown in FIG. 22, during rotation of the plurality of ice cube trays 22 from respective ice-making positions to respective ice-dumping positions, a problem that multiple ice cube trays 22 cannot move smoothly may occur. In view of this, some embodiments of the present disclosure provide another design based on the variant design.

Referring to FIG. 22, the another design provided by some embodiments of the present disclosure based on the variant design is shown below.

When each ice cube tray 22 is at its ice-making position, in a direction from the bottom surface of the ice cube tray 22 to the top surface of the ice cube tray 22 (i.e., a direction perpendicular to or substantially perpendicular to the horizontal plane), the rotating shaft 231 is located above the hinge shaft 223; and in a surface of each ice cube tray 22 on which the driving shaft 222 and the hinge shaft 223 are disposed, the driving shaft 222 is located at a lower right of the hinge shaft 223. Herein, each driving shaft 222 will not be located directly below the corresponding hinge shaft 223.

As shown in FIG. 22, the driving shaft 222 of the first ice cube tray is equivalent to A*1, the driving shaft 222 of the second ice cube tray is equivalent to A*2, the driving shaft 222 of the third ice cube tray is equivalent to A*3, and the swinging shaft 232 is equivalent to O*1. It will be seen from FIG. 22 that, after P1-O*1 that is used as the driving link rotates by approximately 90° clockwise, the three parallelogram mechanisms A*1-B1-P1-O*1, A*2-B2-P1-O*1 and A*3-B3-P1-O*1 will not reach respective dead point positions. Therefore, a dead point position may be avoided during a process in which each ice cube tray 22 rotates by 90° or more to rotate from the ice-making position to the ice-dumping position, and thus the rotation of each ice cube tray 22 may be more smooth.

Figure 23:
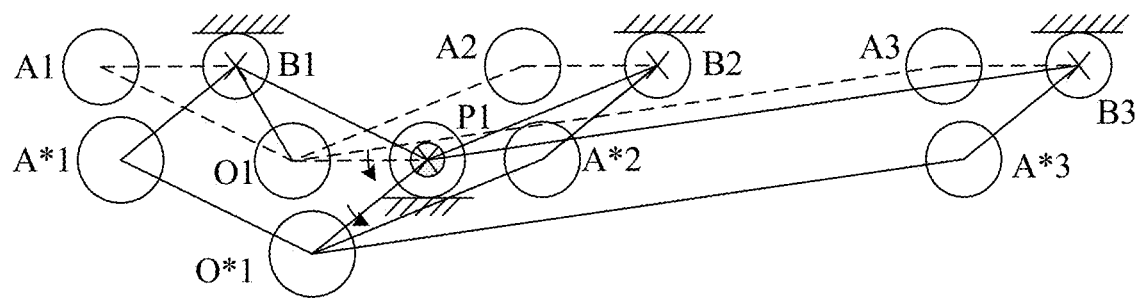
FIG. 23 is a motion analysis comparison diagram of yet another variant design of an ice-making apparatus and another design based on the yet another variant design according to some embodiments of the present disclosure.

Yet another variant design provided by some other embodiments of the present disclosure is shown in FIG. 23. Referring to FIG. 23, in the three parallelogram mechanisms A1-B1-P1-O1, A2-B2-P1-O1, and A3-B3-P1-O1, A1, A2, A3, B1, B2, and B3 are located in a plane parallel to the plane defined by the top surfaces of the plurality of ice cube trays 22 (e.g., a horizontal plane); the position of P1 is lower than that of B1, B2, and B3 in the vertical direction; and when viewed from the position shown in FIG. 4, A1 is located on the left side of B1, A2 is located on the left side of B2, and A3 is located on the left side of B3.

It will be seen from FIG. 23 that, in the variant design, if P1-O1 is used as a driving link and is made to rotate counter clockwise, A1-B1 will not reach a position of P1-B1 after rotating by 90°. That is, during rotation of the first ice cube tray from its ice-making position to its ice-dumping position, the first ice cube tray will not reach its dead point position. However, A2-B2 will reach the position of P1-B2 after rotating by an angle less than 90°. That is, the second ice cube tray will reach its dead point position before rotating to its ice-dumping position. Similarly, A3-B3 will reach the position of P1-B3 after rotating by an angle less than 90°. That is, the third ice cube tray will reach its dead point position before rotating to its ice-dumping position.

Therefore, in the variant design shown in FIG. 23, during rotation of the plurality of ice cube trays 22 from respective ice-making positions to respective ice-dumping positions, a problem that multiple ice cube trays 22 cannot move smoothly may occur. In view of this, some embodiments of the present disclosure provide yet another design based on the variant design.

Referring to FIG. 23, the yet another design provided by some embodiments of the present disclosure based on the variant design is shown below.

When each ice cube tray 22 is at its ice-making position, in the direction from the bottom surface of the ice cube tray 22 to the top surface of the ice cube tray 22 (i.e., a direction perpendicular to or substantially perpendicular to the horizontal plane), the rotating shaft 231 is located below the hinge shaft 223; and in a surface of each ice cube tray 22 on which the driving shaft 222 and the hinge shaft 223 are disposed, the driving shaft 222 is located at a lower left of the hinge shaft 223. Herein, each driving shaft 222 will not be located directly below the corresponding hinge shaft 223.

As shown in FIG. 23, the driving shaft 222 of the first ice cube tray is equivalent to A*1, the driving shaft 222 of the second ice cube tray is equivalent to A*2, the driving shaft 222 of the third ice cube tray is equivalent to A*3, and the swinging shaft 232 is equivalent to O*1. It will be seen from FIG. 23 that, after P1-O*1 that is used as the driving link rotates by approximately 90° counter clockwise, the three parallelogram mechanisms A*1-B1-P1-O*1, A*2-B2-P1-O*1 and A*3-B3-P1-O*1 will not reach respective dead point positions. Therefore, during a process in which each ice cube tray 22 rotates by 90° or more to rotate from the ice-making position to the ice-dumping position, each ice cube tray may not reach its dead point position, and thus the rotation of each ice cube tray 22 may be more smooth.

On a basis of understanding the rotation principle of each ice cube tray 22 in the ice-making apparatus 2, a shape and structure of each component in the ice-making apparatus 2 may be obtained through a corresponding structural design process. With the rotation principle shown in FIG. 20 (corresponding to FIG. 7) as an example, some embodiments of the present disclosure provide an ice-making apparatus 2 in the refrigerator 100. An overall structure of the ice-making apparatus 2 is shown in FIGS. 3 to 17. The structure of the ice-making apparatus 2 will be described below by way of example.

Figure 10:
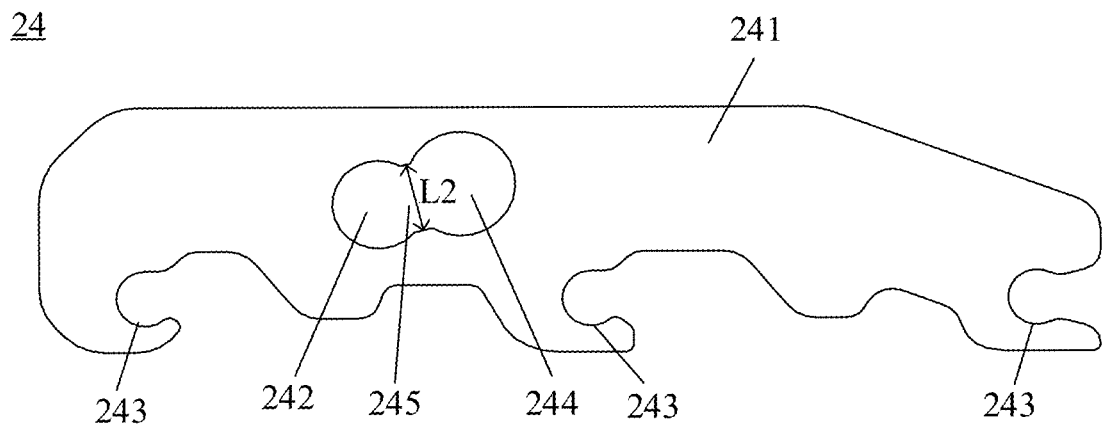
FIG. 10 is a schematic structural diagram of a swinging member according to some embodiments of the present disclosure.
Figure 11:
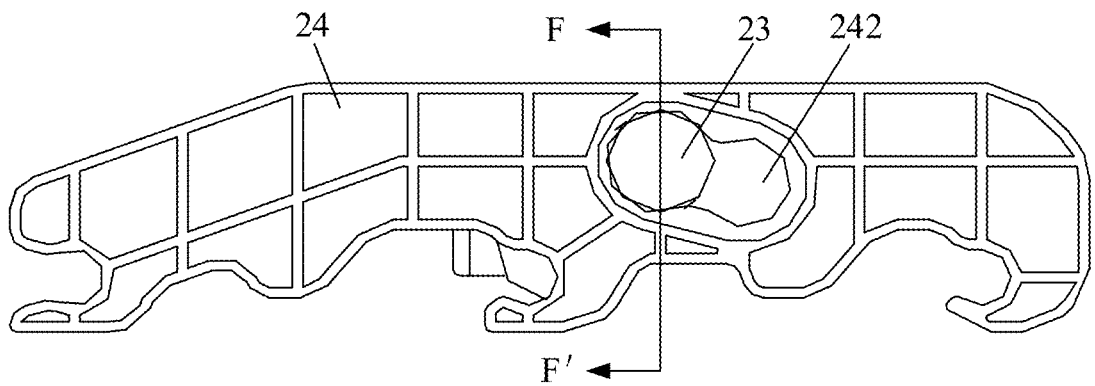
FIG. 11 is a schematic diagram showing how a connecting rod rotating shaft is installed in an installation hole according to some embodiments of the present disclosure.

In some embodiments, referring to FIG. 10, a plurality of support portions 243 of the swinging member 24 in the ice-making apparatus 2 are located below the body 241; the hinge hole 242 is located in a middle region of the body 241; and in a vertical direction, the hinge hole 242 is located above each support portion 243. With this design, the swinging shaft 232 connected to the hinge hole 243 may be located above the plurality of driving shafts 222. Since the driving shaft 222 is located above the corresponding hinge shaft 223, each support portion 243 is also located above the corresponding hinge shaft 223. In this way, during rotation of the plurality of ice cube trays 22 from respective ice-making positions to respective ice-dumping positions, movement interference among the plurality of support portions 243 may be avoided, and thus the rotation of the plurality of ice cube trays 22 may be more smooth.

The plurality of support portions 243 may have various structures. For example, the plurality of support portions 243 include at least one of the following: an arc-shaped groove, a U-shaped groove, or a via hole. The arc-shaped groove or the U-shaped groove is, for example, a structure shown in FIG. 10. If the structure of the plurality of supporting portions 243 is a simple structure such as an arc-shaped groove or a U-shaped groove, a manufacturing process of the swinging member 24 may be simpler, and it may be more convenient to install or remove the plurality of driving shafts 222. If the structure of the plurality of supporting portions 243 is a via hole, it may be possible to prevent the plurality of driving shafts 222 from falling off from the corresponding support portions 243.

During a process in which the swinging member 24 swings and drives the plurality of driving shafts 222 installed on the plurality of support portions 243 to rotate around the corresponding hinge shafts 223 respectively, the ice cube trays 22 may shake along an axial direction of the driving shaft 222, which may cause the driving shaft 222 to be displaced along the axial direction thereof.

In some embodiments, referring to FIGS. 5 and 6, each ice cube tray 22 further includes a stopper block 224. The stopper block 224 is disposed at an end of a corresponding driving shaft 222 facing away from a corresponding tray body 221, and the stopper block 224 is configured to limit a displacement of the corresponding driving shaft 222 along the axis direction thereof. After each driving shaft 222 is installed on the corresponding support portion 243, the stopper block 224 is located at an end of the swinging member 24 facing away from the ice cube tray 22. In this way, during a process in which the driving shaft moves in a direction toward the tray body 221 (that is, when the ice cube tray 22 moves in a direction away from the swinging member 24), the displacement of the driving shaft 222 may be limited by the stopper block 224, so as to prevent the ice cube tray 22 from falling off from the swinging member 24.

There are various ways of connecting the stopper block 224 and the corresponding driving shaft 222, and a connection method thereof is matched with a structure of the support portion 243. For example, if the support portion 243 is an arc-shaped groove or a U-shaped groove, the stopper block 224 may be connected to the corresponding driving shaft 222 in a fixed manner or a detachable manner. If the support portion 243 is a via hole, the stopper block 224 may be connected to the corresponding driving shaft 222 in a detachable manner.

In some embodiments, there are various ways of connecting the swinging member 24 and the swinging shaft 232.

In some examples, the swinging shaft 232 is fixedly installed on the swinging member 24. For example, the swinging shaft 232 is fixedly installed in the hinge hole 242 of the swinging member 24.

In some other examples, the swinging shaft 232 is detachably connected to the swinging member 24. In this way, it may be more convenient to install the connecting rod rotating shaft 23 on and remove the connecting rod rotating shaft from the swinging member 24.

For example, referring to FIGS. 10 to 14, the swinging member 24 further includes an installation hole 244 and an opening 245 disposed in the body 241, and the installation hole 244 is communicated with the hinge hole 242 through the opening 245. A diameter of the installation hole 244 is greater than a diameter of the hinge hole 242 and greater than a diameter of the swinging shaft 232. A size L2 of the opening 245 in a direction perpendicular to a connecting line between a center of the installation hole 244 and a center of the hinge hole 242 is less than the diameter of the swinging shaft 232. Herein, a size of the opening 245 in a direction parallel to the connecting line between the center of the installation hole 244 and the center of the hinge hole 242 is greater than or equal to zero.

Figure 8:
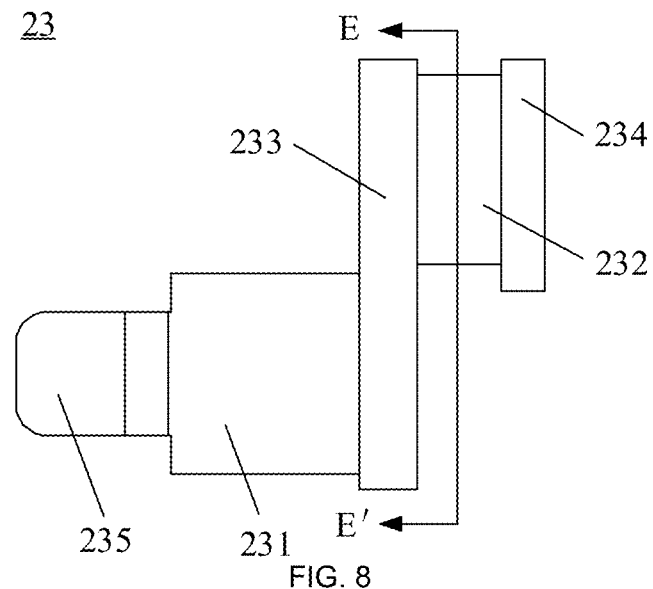
FIG. 8 is a schematic structural diagram of a connecting rod rotating shaft according to some embodiments of the present disclosure.
Figure 9:
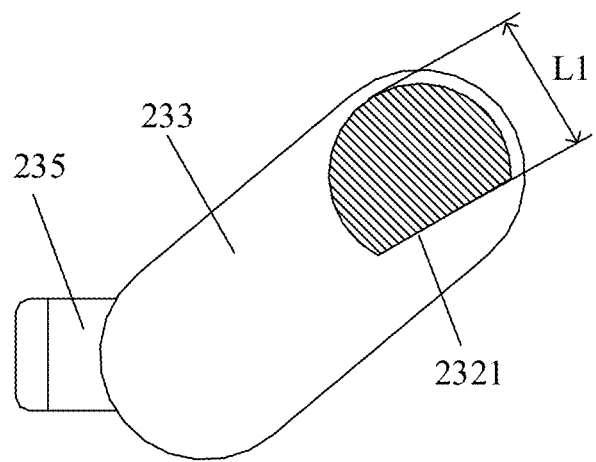
FIG. 9 is a cross-sectional view taking along line E-E' in FIG. 8.

Referring to FIGS. 8 and 9, the swinging shaft 232 includes a flat section 2321, and a thickness L1 of the flat section 2321 is less than the size L2 of the opening in the direction perpendicular to a connecting line between the center of the installation hole 244 and the center of the hinge hole 242, so that the flat section 2321 is able to enter the hinge hole 242 from the installation hole 244 through the opening 245.

With continued reference to FIGS. 10 to 14, during a mounting process of the swinging shaft 232, the swinging shaft 232 is first inserted into the installation hole 244, and then the swinging shaft 232 is rotated, so as to move the swinging shaft 232 to the hinge hole 242 by way of the narrow flat section 2321. Then, the swinging shaft 232 is rotated again, so as to make sure the swinging shaft 232 is caught in the hinge hole 242 and prevent the swinging shaft 232 from coming out of the hinge hole 242 by way of the flat section 2321.

Figure 12:
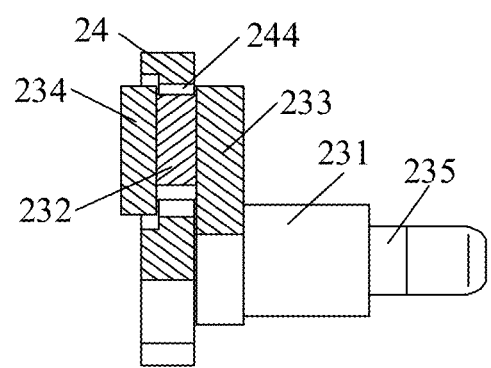
FIG. 12 is a cross-sectional view taking along line F-F' in FIG. 11.
Figure 13:
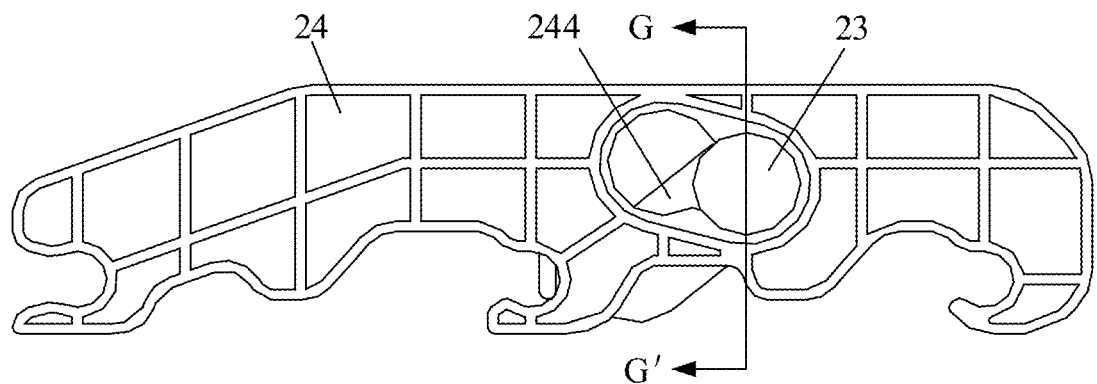
FIG. 13 is a schematic diagram showing how a connecting rod rotating shaft is installed in a hinge hole according to some embodiments of the present disclosure.
Figure 14:
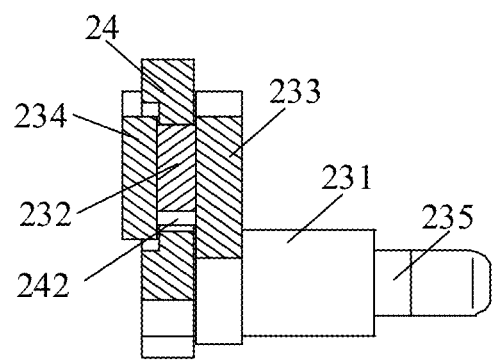
FIG. 14 is a cross-sectional view taking along line G-G' in FIG. 13.

In some embodiments, referring to FIGS. 8, 12 and 14, the connecting rod rotating shaft 23 further includes a protruding edge 234. The protruding edge 234 is disposed at an end of the swinging shaft 232 away from the connecting section 233, and a maximum size of the protruding edge 234 is greater than the diameter of the hinge hole 242 and less than the diameter of the installation hole 244.

The protruding edge 234 may have various shapes. For example, a shape of the protruding edge 234 includes a circle, an ellipse, a square, or a rectangle. A maximum size of the protruding edge 234 is related to the shape of the protruding edge 234. For example, if the shape of the protruding edge 234 is a circle, the maximum size of the protruding edge 234 is a diameter of the circle; if the shape of the protruding edge 234 is an ellipse, the maximum size of the protruding edge 234 is a length of a major axis of the ellipse; and if the shape of the protruding edge 234 is a square or a rectangle, the maximum size of the protruding edge 234 is a length of a diagonal of the square or the rectangle.

The maximum size of the protruding edge 234 is set to be greater than the diameter of the hinge hole 242 and less than the diameter of the installation hole 244, so that in a case where the swinging shaft 232 and the swinging member are detachably connected, it is possible to ensure that the protruding edge 234 is able to pass through the installation hole 244. Moreover, after the swinging shaft 232 is installed in the hinge hole 242, it may be possible to limit a displacement of the swinging shaft 232 along the axis direction thereof.

Figure 15:
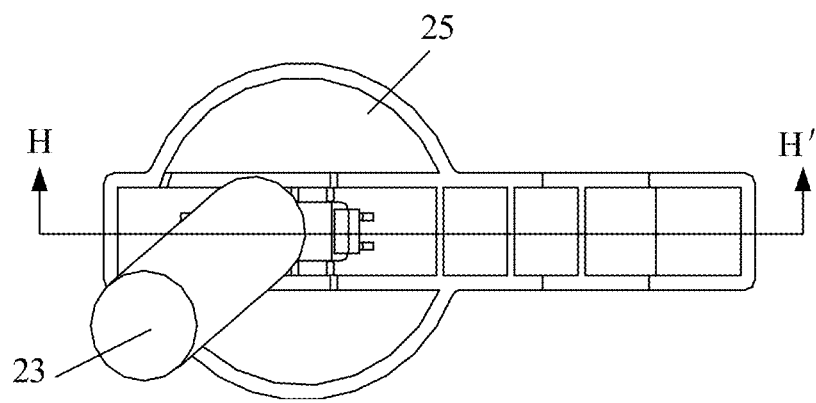
FIG. 15 is a schematic diagram showing how a manual knob and a connecting rod rotating shaft are assembled according to some embodiments of the present disclosure.
Figure 16:
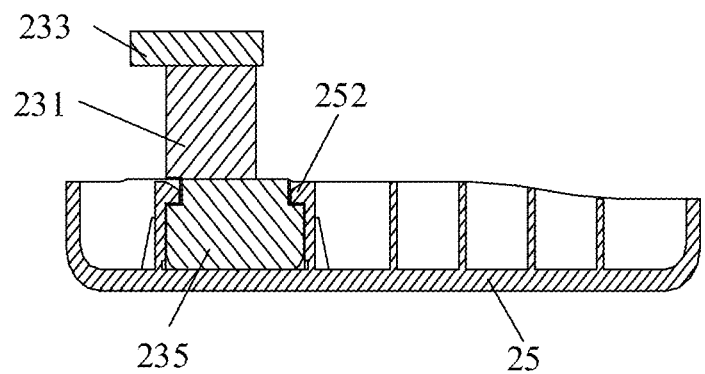
FIG. 16 is a cross-sectional view taking along line H-H' in FIG. 15.
Figure 17:
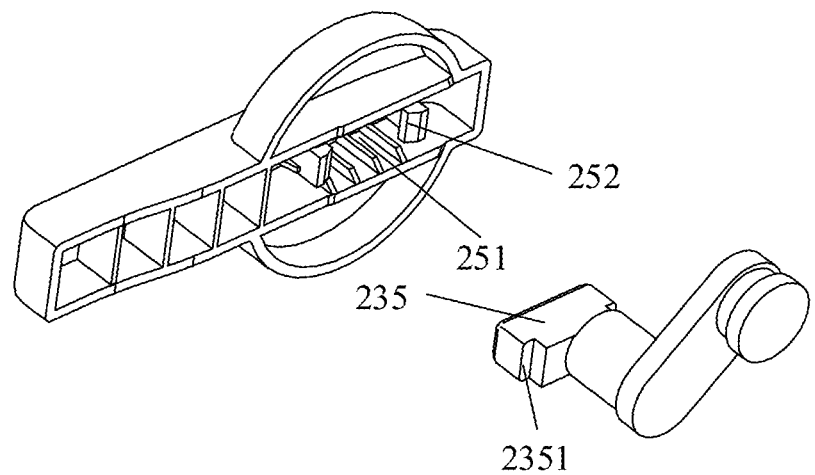
FIG. 17 is a schematic exploded view of a manual knob and a connecting rod rotating shaft according to some embodiments of the present disclosure.

In some embodiments, referring to FIGS. 15 to 17, the ice-making apparatus 2 further includes a manual knob 25. The manual knob 25 is disposed on a side of the support 21 facing away from each ice cube tray 22, and is connected to the rotating shaft 231 of the connecting rod rotating shaft 23. In a case where a manual knob 25 connected to the rotating shaft 231 is provided, by turning the manual knob 25, the rotating shaft 231 may be rotated, and thus the plurality of ice cube trays 22 may be rotated. This design is more labor-saving than rotating the plurality of ice cube trays 22 by rotating the rotating shaft 231.

The ice-making apparatus 2 may also be connected to the rotating shaft 231 by an electric knob.

In some examples, the manual knob 25 is directly connected to the rotating shaft 231.

In another example, the manual knob 25 is indirectly connected to the rotating shaft 231. With continued reference to FIGS. 15 to 17, the connecting rod rotating shaft 23 further includes a fixed section 235. The fixed section 235 is connected to an end of the rotating shaft 231 away from the connecting section 233. The manual knob 25 is mounted on the fixed section 235.

The fixed section 235 includes a clamping groove 2351. The manual knob 25 includes a mounting groove 251 and a buckle 252 that is disposed in the mounting groove 251 and matched with the clamping groove 2351. In this way, a connection between the fixed section 235 and the manual knob 25 may be more stable.

In addition, slide table(s) are provided in the mounting groove 251, and slide groove(s) respectively matched with the slide table(s) are provided in the fixed section 235. In this way, the fixed section 235 may be more tightly mounted in the mounting groove 25, and a relative displacement between the fixed section 235 and the manual knob 25 during a process of rotating the manual knob 25 may be avoided. In addition, the manual knob 25 is provided with a mounting hole for inserting the rotating shaft 231, and a side wall of the rotating shaft 231 is provided with a positioning hole. After the rotating shaft 231 is fixed in the mounting hole, a positioning pin is inserted into the positioning hole through the manual knob 25. In this way, the connection between the rotating shaft 231 and the manual knob 25 may be further fixed. A rotational direction is marked on the manual knob 25, so as to clearly indicate the rotational direction of the plurality of ice cube trays 22 from respective ice-making position to respective ice-dumping position.

In some embodiments, referring to FIG. 5, the ice-making apparatus 2 further includes a plurality of resetting members 26. The plurality of resetting members 26 are configured to drive the plurality of ice cube trays 22 to reset from respective ice-dumping positions to respective ice-making positions.

The plurality of resetting members 26 include at least one of a torsion spring or a jacking cylinder.

In a case where the plurality of resetting members 26 each includes a torsion spring, the torsion spring is sleeved on the hinge shaft 223 of a corresponding ice cube tray 22, and two arms of the torsion spring are connected to the support 21 and the hinge shaft 223 respectively. In this way, after the connecting rod rotating shaft 23 is rotated to make each ice cube tray rotate from the ice-making position to the ice-dumping position, the torsion spring will be compressed. In this case, when the user stops applying a force on the connecting rod rotating shaft 23, each ice cube tray 22 may be able to rotate from the ice-dumping position back to the ice-making position under a restoring force of the corresponding torsion spring. The torsion spring occupies a small space, and a mounting relationship of the torsion spring is very simple. Moreover, a manufacturing cost of the ice-making apparatus 2 may be reduced if the torsion spring is adopted.

In a case where the plurality of resetting members 26 each includes a jacking cylinder, one end of the jacking cylinder is connected to the tray body 221 of a corresponding ice cube tray 22, and another end is connected to the support 21. In this way, after each ice cube tray 22 rotates from the ice-making position to the ice-dumping position, the jacking cylinder will be extended. When each ice cube tray 22 needs to be rotated from the ice-dumping position back to the ice-making position, the jacking cylinder will shorten, pulling the ice cube tray 22 back to the ice-making position.

In some embodiments, the purpose of driving the plurality of ice cube trays 22 to rotate synchronously may also be achieved by a structure described below. The structure includes a driving motor, a transmission shaft, transmission wheels, and a transmission belt. The transmission shaft is connected to an output shaft of the driving motor; the transmission wheels are mounted on the driving shafts 222; and the transmission wheels on two adjacent ice cube trays 22 are connected through the transmission belt. During operation of the driving motor, the plurality of ice cube trays 22 may be driven to rotate synchronously through cooperation of the transmission wheels and the transmission belt.

In the description of the present disclosure, specific features, structures, materials or characteristics may be combined in any suitable manner in any one or more embodiments or examples.

The foregoing descriptions are merely some specific implementation manners of the present disclosure, but the protection scope of the present disclosure is not limited thereto. Any person skilled in the art could readily conceive of changes or replacements within the technical scope disclosed by the present disclosure, which shall all be included in the protection scope of the present disclosure. Therefore, the protection scope of the present disclosure shall be subject to the protection scope of the claims.

What is claimed is:

1. A refrigerator, comprising:
a freezer compartment; and
an ice-making apparatus, the ice-making apparatus being disposed in the freezer compartment, wherein
the ice-making apparatus includes:
a support including a rectangular frame;
a plurality of ice cube trays arranged in parallel, each ice cube tray including a tray body, and a driving shaft and a hinge shaft connected to the tray body, the driving shaft and the hinge shaft being parallel to each other, the ice cube tray being hinged in the support through the hinge shaft, the hinge shaft including a first hinge shaft and a second hinge shaft, the first hinge shaft being located between a first side of the tray body and a first border of the rectangular frame, the second hinge shaft being located between a second side of the tray body and a second border of the rectangular frame, the first side being opposite to the second side, and the first border being opposite to the second border;
a connecting rod rotating shaft, the connecting rod rotating shaft including a rotating shaft and a swinging shaft that are arranged in parallel and spaced from each other, and a connecting section connecting the rotating shaft and the swinging shaft, the connecting rod rotating shaft being hinged to the support through the rotating shaft, and the swinging shaft including a flat section; and
a swinging member, the swinging member including a body, a hinge hole provided in the body, a plurality of support portions provided on the body, and an installation hole and an opening disposed in the body, the installation hole being communicated with the hinge hole through the opening, a diameter of the installation hole being greater than a diameter of the hinge hole and greater than a diameter of the swinging shaft, a size of the opening being less than the diameter of the swinging shaft, a thickness of the flat section being less than a size of the opening in a direction perpendicular to a connecting line between a center of the installation hole and a center of the hinge hole so that the flat section is able to enter the hinge hole from the installation hole through the opening, the swinging shaft being installed in the hinge hole, and the driving shaft of the ice cube tray being installed on a corresponding support portion so that the swinging member is swingably connected between the support and the plurality of ice cube trays,
wherein the rotating shaft is configured to drive the swinging shaft to rotate, so that the swinging shaft drives the swinging member to swing, the swinging member drives the driving shaft to rotate around the hinge shaft, and each ice cube tray rotates around a corresponding hinge shaft; and each driving shaft is configured in a way that: during rotation of the plurality of ice cube trays from respective ice-making positions to respective ice-dumping positions, a connecting line between each driving shaft and a corresponding hinge shaft rotates around the corresponding hinge shaft and stops rotating before reaching a connecting line between the rotating shaft and the corresponding hinge shaft for a first time.

2. The refrigerator according to claim 1, wherein a plane defined by an axis of the driving shaft and an axis of the hinge shaft of each ice cube tray is parallel to a plane defined by an axis of the swinging shaft and an axis of the rotating shaft; and a distance between the axis of the driving shaft and the axis of the hinge shaft of each ice cube tray is equal to a distance between the axis of the swinging shaft and the axis of the rotating shaft.

3. The refrigerator according to claim 2, wherein when the plurality of ice cube trays are at respective ice-making positions, a plane on which the plurality of ice cube trays are located is perpendicular to or substantially perpendicular to a gravity direction of the plurality of ice cube trays; and when the plurality of ice cube trays are at respective ice-dumping positions, the plurality of ice cube trays are rotated by an angle greater than or equal to 90°.

4. The refrigerator according to claim 2, wherein when the plurality of ice cube trays are at respective ice-making positions, in a direction from bottom surfaces of the plurality of ice cube trays to top surfaces of the plurality of ice cube trays, the rotating shaft is located above the hinge shaft of the ice cube tray; and in a surface of the ice cube tray on which the driving shaft and the hinge shaft are disposed and viewing from a side of the surface of the ice cube tray away from the driving shaft, the driving shaft is located at an upper left of the hinge shaft.

5. The refrigerator according to claim 4, wherein when the plurality of ice cube trays are at respective ice-making positions, an angle between a plane defined by the axis of the driving shaft and the axis of the hinge shaft and a plane defined by the top surfaces of the plurality of ice cube trays is an acute angle.

6. The refrigerator according to claim 2, wherein when the plurality of ice cube trays are at respective ice-making positions, in a direction from bottom surfaces of the plurality of ice cube trays to top surfaces of the plurality of ice cube trays, the rotating shaft is located above the hinge shaft of the ice cube tray; and in a surface of the ice cube tray on which the driving shaft and the hinge shaft are disposed and viewing from a side of the surface of the ice cube tray away from the driving shaft, the driving shaft is located at a lower right of the hinge shaft.

7. The refrigerator according to claim 2, wherein when the plurality of ice cube trays are at respective ice-making positions, in a direction from bottom surfaces of the plurality of ice cube trays to top surfaces of the plurality of ice cube trays, the rotating shaft is located below the hinge shaft of the ice cube tray; and in a surface of the ice cube tray on which the driving shaft and the hinge shaft are disposed and viewing from a side of the surface of the ice cube tray away from the driving shaft, the driving shaft is located at a lower left of the hinge shaft.

8. The refrigerator according to claim 1, wherein the connecting rod rotating shaft further includes a protruding edge; and the protruding edge is disposed at an end of the swinging shaft away from the connecting section, and a maximum size of the protruding edge is greater than the diameter of the hinge hole and less than the diameter of the installation hole.

9. The refrigerator according to claim 1, wherein the plurality of support portions include at least one of an arc-shaped groove, a U-shaped groove, or a via hole.

10. The refrigerator according to claim 1, wherein each ice cube tray further includes a stopper block; and the stopper block is disposed at an end of the driving shaft facing away from the tray body, and the stopper block is configured to limit a displacement of the driving shaft along an axis direction thereof.

11. The refrigerator according to claim 1, wherein the ice-making apparatus further includes a manual knob; and the manual knob is disposed on a side of the support facing away from the plurality of ice cube trays, and is connected to the rotating shaft.

12. The refrigerator according to claim 11, wherein the connecting rod rotating shaft further includes a fixed section;

the fixed section is connected to an end of the rotating shaft facing away from the connecting section; and the manual knob is mounted on the fixed section.

13. The refrigerator according to claim 12, wherein the fixed section includes a clamping groove; and the manual knob includes a mounting groove and a buckle provided in the mounting groove, and the buckle is matched with the clamping groove.

14. The refrigerator according to claim 1, wherein the ice-making apparatus further includes a plurality of resetting members, and the plurality of resetting members are configured to drive the plurality of ice cube trays to reset from respective ice-dumping positions to respective ice-making positions.

15. The refrigerator according to claim 14, wherein the plurality of resetting members include at least one of a torsion spring or a jacking cylinder.

16. The refrigerator according to claim 1, wherein a temperature inside the freezer compartment is capable of being below zero degrees Celsius.

17. The refrigerator according to claim 1, wherein an angle between a plane defined by an axis of each driving shaft and an axis of a corresponding hinge shaft and a plane defined by top surfaces of the plurality of ice cube trays is equal.

18. An ice-making apparatus, comprising:

a support including a rectangular frame;

a plurality of ice cube trays arranged in parallel, each ice cube tray including a tray body, and a driving shaft and a hinge shaft connected to the tray body, the driving shaft and the hinge shaft being parallel to each other, the ice cube tray being hinged in the support through the hinge shaft, the hinge shaft including a first hinge shaft and a second hinge shaft, the first hinge shaft being located between a first side of the tray body and a first border of the rectangular frame, the second hinge shaft being located between a second side of the tray body and a second border of the rectangular frame, the first side being opposite to the second side, and the first border being opposite to the second border;

a connecting rod rotating shaft, the connecting rod rotating shaft including a rotating shaft and a swinging shaft that are arranged in parallel and spaced from each other, and a connecting section connecting the rotating shaft and the swinging shaft, the connecting rod rotating shaft being hinged to the support through the rotating shaft, and the swinging shaft including a flat section; and a swinging member, the swinging member including a body, a hinge hole provided in the body, a plurality of support portions provided on the body, and an installation hole and an opening disposed in the body, the installation hole being communicated with the hinge hole through the opening, a diameter of the installation hole being greater than a diameter of the hinge hole and greater than a diameter of the swinging shaft, a size of the opening being less than the diameter of the swinging shaft, a thickness of the flat section being less than a size of the opening in a direction perpendicular to a connecting line between a center of the installation hole and a center of the hinge hole so that the flat section is able to enter the hinge hole from the installation hole through the opening, the swinging shaft being installed in the hinge hole, and the driving shaft of the ice cube tray being installed on a corresponding support portion so that the swinging member is swingably connected between the support and the plurality of ice cube trays, wherein the rotating shaft is configured to drive the swinging shaft to rotate, so that the swinging shaft drives the swinging member to swing, the swinging member drives the driving shaft to rotate around the hinge shaft, and each ice cube tray rotates around a corresponding hinge shaft; and each driving shaft is configured in a way that: during rotation of the plurality of ice cube trays from respective ice-making positions to respective ice-dumping positions, a connecting line between each driving shaft and a corresponding hinge shaft rotates around the corresponding hinge shaft and stops rotating before reaching a connecting line between the rotating shaft and the corresponding hinge shaft for a first time.

19. A refrigerator, comprising:

a freezer compartment; and an ice-making apparatus, the ice-making apparatus being disposed in the freezer compartment, wherein the ice-making apparatus includes:
  a support;
  a plurality of ice cube trays arranged in parallel, each ice cube tray including a tray body, and a driving shaft and a hinge shaft connected to the tray body, the driving shaft and the hinge shaft being parallel to each other, and the ice cube tray being hinged in the support through the hinge shaft;
  a connecting rod rotating shaft, the connecting rod rotating shaft including a rotating shaft and a swinging shaft that are arranged in parallel and spaced from each other, and a connecting section connecting the rotating shaft and the swinging shaft, and the connecting rod rotating shaft being hinged to the support through the rotating shaft; and
  a swinging member, the swinging member including a body, a hinge hole provided in the body, and a plurality of support portions provided on the body, the swinging shaft being installed in the hinge hole, and the driving shaft of the ice cube tray being installed on a corresponding support portion so that the swinging member is swingably connected between the support and the plurality of ice cube trays, wherein the rotating shaft is configured to drive the swinging shaft to rotate, so that the swinging shaft drives the swinging member to swing, the swinging member drives the driving shaft to rotate around the hinge shaft, and each ice cube tray rotates around a corresponding hinge shaft;

each driving shaft is configured in a way that: during rotation of the plurality of ice cube trays from respective ice-making positions to respective ice-dumping positions, a connecting line between each driving shaft and a corresponding hinge shaft rotates around the corresponding hinge shaft and stops rotating before reaching a connecting line between the rotating shaft and the corresponding hinge shaft for a first time;

the swinging member further includes an installation hole and an opening disposed in the body, and the installation hole is communicated with the hinge hole through the opening;

a diameter of the installation hole is greater than a diameter of the hinge hole and greater than a diameter of the swinging shaft, and a size of the opening is less than the diameter of the swinging shaft; and the swinging shaft includes a flat section, and a thickness of the flat section is less than a size of the opening in a direction perpendicular to a connecting line between a center of the installation hole and a center of the hinge hole, so that the flat section is able to enter the hinge hole from the installation hole through the opening.

* * * * *